United States Patent
Zaggl et al.

(10) Patent No.: US 10,113,097 B2
(45) Date of Patent: Oct. 30, 2018

(54) PROCESS FOR THE PRODUCTION OF A THERMALLY CONDUCTIVE ARTICLE

(71) Applicants: W. L. Gore & Associates GmbH, Putzbrunn (DE); W. L. Gore & Associates, Inc., Newark, DE (US)

(72) Inventors: Alexander Zaggl, Feldkirchen-Westerham (DE); Holger Zoudlik, Kolbermoor (DE); Michael Wendlandt, Ottobrunn (DE); Michael Adam Hall, Newark, DE (US)

(73) Assignees: W.L. Gore & Associates, Inc., Newark, DE (US); W.L. Gore & Associates GmbH, Putzbrunn (DE)

(*) Notice: Subject to any disclaimer, the term of this patent is extended or adjusted under 35 U.S.C. 154(b) by 0 days.

(21) Appl. No.: 15/511,665

(22) PCT Filed: Sep. 26, 2014

(86) PCT No.: PCT/US2014/057576
§ 371 (c)(1),
(2) Date: Mar. 16, 2017

(87) PCT Pub. No.: WO2016/048335
PCT Pub. Date: Mar. 31, 2016

(65) Prior Publication Data
US 2017/0292053 A1    Oct. 12, 2017

(51) Int. Cl.
*C09K 5/14* (2006.01)
*F28F 3/02* (2006.01)
(Continued)

(52) U.S. Cl.
CPC .......... *C09K 5/14* (2013.01); *F28F 1/105* (2013.01); *F28F 3/025* (2013.01); *F28F 21/06* (2013.01)

(58) Field of Classification Search
CPC .......................................................... C09K 5/14
(Continued)

(56) References Cited

U.S. PATENT DOCUMENTS 3,953,566 A    4/1976    Gore
3,962,153 A    6/1976    Gore
(Continued)

FOREIGN PATENT DOCUMENTS

EP    2551324    1/2013
JP    2002532914    10/2002
(Continued)

OTHER PUBLICATIONS

Price, D.M. & Jarratt, M. (2002) "Thermal Conductiivity of PTFE abd OTFE Composites" Thermochimica Acta 392-393, p. 231-235.
(Continued)

*Primary Examiner* — Brent T O'Hern
(74) *Attorney, Agent, or Firm* — Amy L. Miller

(57) ABSTRACT

The present disclosure relates to a process for the production of a thermally conductive article that includes (1) pleating a thermally anisotropic sheet having a thermal conductivity in a first plane that is higher than the thermal conductivity in a second plane perpendicular to the first plane and (2) compacting the pleated structure. An article obtained by the process, the use of the thermally conductive article for production of a device, and the device are also disclosed.

31 Claims, 16 Drawing Sheets

(51) Int. Cl.
*F28F 1/10* (2006.01)
*F28F 21/06* (2006.01)

(58) Field of Classification Search
USPC .......................................................... 428/121
See application file for complete search history.

(56) References Cited

U.S. PATENT DOCUMENTS

| | | | |
|---|---|---|---|
| 4,064,214 A | | 12/1977 | FitzGerald |
| 5,478,372 A | * | 12/1995 | Stark .................... B01D 39/086 55/521 |
| 5,738,936 A | | 4/1998 | Hanrahan |
| 5,945,217 A | | 8/1999 | Hanrahan |
| 2004/0033364 A1 | | 2/2004 | Spiridigliozzi et al. |
| 2010/0301258 A1 | | 12/2010 | Chen et al. |
| 2011/0135884 A1 | * | 6/2011 | Lettow ..................... B32B 1/04 428/174 |

FOREIGN PATENT DOCUMENTS

| | | |
|---|---|---|
| JP | 2003115567 | 4/2003 |
| JP | U003102856 | 7/2004 |
| JP | 2007273943 | 10/2007 |
| JP | 2010137562 | 6/2010 |
| JP | 2012031242 | 2/2012 |
| JP | 2014143400 | 8/2014 |
| JP | 2014522109 | 8/2014 |
| WO | WO98/22770 | 5/1998 |
| WO | WO-9822770 A1 * 5/1998 ............ B01J 15/005 |

OTHER PUBLICATIONS

Blumm, J, Lindemann, A., Meyer, M. & Strasser, C. (2010) "Characterizaiton of PTFE Using Advanced Thermal Analysis Techniques" International Journal of Thermophysics 31, 1919-1927.

Wright, J. L. and Hollands, K.G.T. "Radiant and Free Convective Heat Transfer Through a Pleated (V-Corrugated) Plastic Film" Solar Energy, vol. 43, No. 6, pp. 379-384 1989.

* cited by examiner

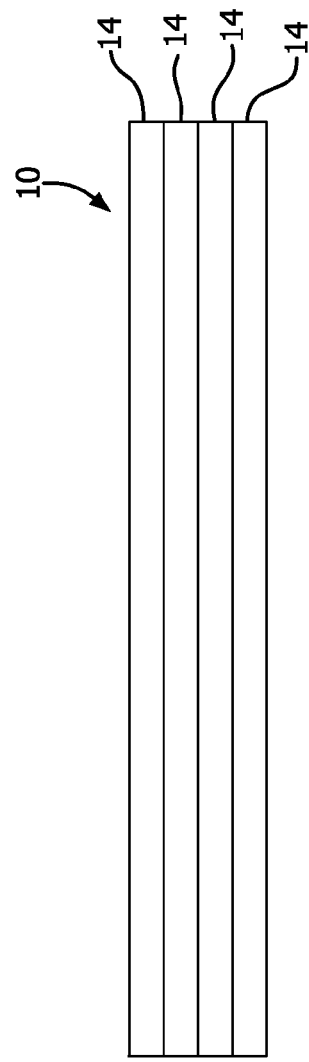
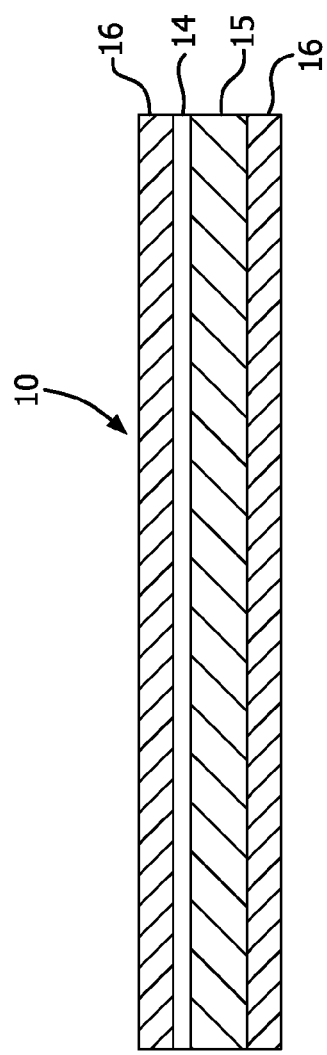
FIG. 2a
FIG. 2b

PROCESS FOR THE PRODUCTION OF A THERMALLY CONDUCTIVE ARTICLE

FIELD

The present invention relates to a process for the production of a thermally conductive article, to a thermally conductive article obtainable by said process, to the use of said article production of a device for conduction of heat and to such a device comprising said article.

BACKGROUND

Polymers such as polytetrafluoroethylene (PTFE) are known to have a low intrinsic thermal conductivity which for dense, isotropic PTFE is less than 0.35 W/mK within a wide range of temperatures from −140° C. to at least 232° C., see e.g. Price, D. M. & Jarratt, M. (2002), "Thermal conductivity of PTFE and PTFE composites", Thermochimica Acta 392-393, p. 231-236 or Blumm, J.; Lindemann, A.; Meyer, M. & Strasser, C. (2010), "Characterization of PTFE Using Advanced Thermal Analysis Techniques", International Journal of Thermophysics 31, 1919-1927.

It is known that the thermal conductivity of expanded porous PTFE is generally even lower due to the presence of air, typically only one tenth to about one half of the value for the dense material as a function of the porosity. These materials have therefore found application as thermal insulators (see e.g. U.S. Pat. No. 3,953,566, column 5, line 64 to column 6, line 2).

For applications as e.g. for the heat transfer from integrated circuits ("IC") it is desired to make use of the advantageous properties of fluoropolymers, but, at the same time, thermal conductivity is required. It is known to make fluoropolymers such as PTFE thermally conductive by the incorporation of thermally conductive particles, for example metal particles, oxides or nitrides, and PCM or elastomers. Such thermally conductive PTFE composites are disclosed e.g. in U.S. Pat. No. 5,945,217 and U.S. Pat. No. 5,738,936.

However, the use of such filled fluoropolymers has several drawbacks; in particular, there is usually a loss of the outstanding properties of PTFE like stability against harsh chemical environments or a change of dielectric properties.

It is furthermore known for example from EP 2 551 324 that the intrinsic thermal conductivity of fluoropolymers such as polytetrafluoroethylene (PTFE) can be enhanced by a specific orienting, process so that sheets of the polymer are obtained which have highly increased thermal conductivity in at least one or even two directions within the plane of the sheet. However, the thermal conductivity perpendicular to the plane of the sheet remains small or even slightly decreases due to the orientation, so that the oriented sheets have a highly anisotropic thermal conductivity.

It is therefore one of the objects of the present invention to provide a process which allows to increase the thermal conductivity of thermally anisotropic sheets, such as fluoropolymer sheets, in the direction perpendicular to the sheet, so that new and improved thermally conductive articles and devices can be produced.

SUMMARY

The present invention is based on the finding that the thermal conductivity of a sheet in the direction perpendicular to the sheet can be highly increased by pleating the sheet and compacting the formed pleated structure.

The present invention therefore provides a process for the production of a thermally conductive article comprising pleating a thermally anisotropic sheet which has a thermal conductivity in plane which is higher than the thermal conductivity perpendicular to the plane, and compacting the pleated sheet.

It has surprisingly been found that by pleating a sheet and compacting said pleated sheet the thermal conductivity of the pleated sheet perpendicular to the pleats is highly increased compared to the thermal conductivity of a simple stack of the same sheets in the direction perpendicular to the stack.

It is thus possible to provide sheets with a highly increased thermal conductivity in the direction perpendicular to the plane of the sheet.

Furthermore, it is possible to use the pleated structures to design new thermally conductive devices. For example, cooling devices such as cooling ribbons which create additional forced convective heat loss and increased surface area may be provided.

The term "sheet" is intended to denote all articles with an extension in two dimension being large compared to the extension in the other remaining dimension, e.g. articles usually denoted as sheets, films, membranes or tapes. A sheet therefore has two opposing surfaces, which have a high surface area compared to the two opposing edges of the sheet (in case of an "endless" sheet). In one embodiment, the sheet comprises at least one layer. In another embodiment, the sheet comprises several layers made of one sheet material or made of different sheet materials.

"Thermally anisotropic" means that the sheets show a different intrinsic thermal conductivity in at least two directions, i.e. that they show a comparatively high intrinsic thermal conductivity in one direction and a comparatively low intrinsic thermal conductivity in another direction. In the thermally anisotropic sheets used in the process of the present invention, the thermal conductivity in plane is higher than the thermal conductivity perpendicular to the plane.

A pleat is created and defined by three parallel bends of the sheet (a first bend, a middle bend and a last bend), and each pleat has two bends in common with the adjacent pleat(s).

The pleats thus formed have a certain height, which is defined to be the distance between the middle bend and the closer succeeding bend (either the first or the last bend), measured from the top of each bend.

Compacting is done so that the surfaces of the sheet which faces each other due to the formation of the pleats are at least partially brought in direct contact with each other.

Compacting may be done by exerting a pressure on the pleats in the direction perpendicular to the pleats.

In one embodiment, the compacted pleated structure, partly or fully, is stabilized. This means that the pleats, partially or fully, are fixed in their relative position to each other.

In this manner, the pleated structure formed is conserved in the form as obtained (or nearly as obtained) after compacting.

In one example, stabilization of the pleated structure is effected by bonding a film to one or more of the surfaces (formed by the bends of the pleats) or edges (formed by the edges of the sheet) of the pleated structure. Bonding of said film may be effected e.g. by thermo bonding, i.e. by applying heat and pressure.

In another example, a film is bonded to one, i.e. upper or lower, or both surfaces of the pleated structure.

In a further embodiment of the process of the invention, the thermally anisotropic sheet is treated with a thermal interphase wax.

Treatment of the sheet with a thermal interphase wax further increases the thermal conductivity of the pleated sheet in the direction perpendicular to the pleats.

As thermal interface wax a commercially available phase change wax can be used, like for example Crayotherm® KU-CR having a thermal conductivity of 0.47 W/mK (commercially available by KUNZE Folien GmbH, Germany).

In the process of the invention, a thermally anisotropic sheet is pleated so that pleats with a certain height as defined above are formed.

In one example, the pleat height in relation to the sheet thickness is from 1000:1 to 2:1, preferably from 500:1 to 3:1, and most preferably from 100:1 to 5:1.

Furthermore, in one embodiment the sheet is pleated so that in the resulting pleated structure pleats with different heights exist. The pleat height to be used in the above relation to the film thickness is then the average pleat height.

The sheet thickness of the unpleated sheet is preferably from 1 to 500 micrometer, more preferably from 2 to 250 micrometer and most preferably from 5 to 100 micrometer.

In one example, the height of the pleats is from 10 to 10000 micrometer; more preferably is from 20 to 5000 micrometer and most preferably is from 40 to 2500 micrometer.

Pleating of the sheet is preferably performed perpendicular to the direction of maximum thermal conductivity.

This means that, for example, if an "endless" sheet is used, the sheet has its maximum thermal conductivity in machine direction and is pleated perpendicular to that direction.

Pleating of the sheet may be performed in such a manner that the sheet is passed through two counter-rotating toothed wheels, denoted as "pleating rolls". The teeth of these rotating wheels are designed so that no disruption of the sheet occurs, in particular, the teeth should not be too sharp-edged. For example, the teeth may have a sinusoidal form.

The height of the teeth determines the height of the pleats formed upon passing through the pleating rolls.

By compressing the pleats, the thermal conductivity of the pleated structure in the direction perpendicular to the pleats can be further enhanced.

In one embodiment, the thermally anisotropic sheet comprises, or consists of, a thermally anisotropic polymer layer.

In a further embodiment, the thermally anisotropic polymer layer comprises, or consists of, a polyolefin, such as polyethylene, or a fluoropolymer.

The fluoropolymer comprises, or consists of, polytetrafluoroethylene (PTFE), a modified PTFE, a fluorothermoplastic, a fluoroelastomer or any combination thereof.

The fluoropolymer may be partially fluorinated or fully fluorinated, i.e. perfluorinated.

In one embodiment, the fluoropolymer comprises, or consists of, polytetrafluoroethylene (PTFE), a modified PTFE, a fluorothermoplastic or a fluoroelastomer or any combination of these materials. The term "modified PTFE" as used herein is intended to denote a type of tetrafluoroethylene copolymer in which in addition to tetrafluoroethylene monomer units further perfluorinated, fluorinated or non-fluorinated co-monomer units are present, for example in a range of from 0.005 to 15 mol %.

In a further embodiment, the substrate fluoropolymer comprises, or consists of, polytetrafluoroethylene (PTFE), a modified PTFE, a fluorothermoplastic or a fluoroelastomer or any combination of these materials.

In still a further embodiment, the fluoropolymer comprises, or consists of, PTFE and/or a modified PTFE, and in still a further embodiment, the fluoropolymer comprises, or consists of, PTFE.

In a particularly embodiment, sheets are used in the process of the present invention as disclosed in EP 2 551 324.

In case a polymeric sheet is used in the process of the present invention, the sheet or at least the polymeric layer(s) of the sheet preferably consist of the pure polymer, i.e. no further compound or filler has been added to the polymer. In this embodiment, undesired water adsorbance due to the presence of such additives is avoided. This is especially important for the application in electrical components.

In an embodiment, the intrinsic thermal conductivity of the sheet is 0.5 W/mK or more, in a further embodiment it is 0.7 W/mK or more, in still a further embodiment it is 1 W/mK or more, in a still further embodiment it is 5 W/mK or more, and in still a further embodiment it is 8 W/mK or more, in the direction of maximum intrinsic thermal conductivity.

All indications of thermal conductivities and diffusivities as well as any ratios thereof as contained herein relate to a measurement temperature of 40° C., unless otherwise indicated.

Usually, the intrinsic thermal conductivity in the direction of maximum intrinsic thermal conductivity does not exceed 40 W/mK.

Of course, intrinsic thermal conductivities as high as possible are desired, however, for certain applications a lower conductivity may be acceptable, for example, where the amounts of heat to be transferred is smaller.

The thermally anisotropic sheet of the process of the present invention has different intrinsic thermal conductivities in at least two directions, with the anisotropy ratio of the intrinsic thermal conductivity being defined as the ratio of the intrinsic thermal conductivity in the direction of maximum intrinsic thermal conductivity divided by the intrinsic thermal conductivity in the direction of minimum intrinsic thermal conductivity.

Usually, the sheet has its minimum intrinsic thermal conductivity in the direction perpendicular to the plane, and its maximum, intrinsic thermal conductivity in the direction of the plane.

In the process of the invention, sheets may be used which have differing intrinsic thermal conductivity in different directions within the plane. For example, such sheets, are obtained by a mono-axial orientation of fluoropolymer sheets, see EP 2 551 324.

In one embodiment, the sheet has its direction of maximum thermal conductivity perpendicular to the orientation of the pleats, for example, if an "endless sheet" is used preferably the direction of maximum intrinsic thermal conductivity will be in the machine ("endless") direction.

In one embodiment, the sheet has an anisotropy ratio of the intrinsic thermal conductivity of more than 5, in another embodiment of 10 or more, in still a further embodiment of 15 or more, in still a further embodiment of 20 or more, in still a further embodiment of 25 or more, in still a further embodiment of 30 or more, and in still a further embodiment of 40 or more.

In practice, the ratio will usually not exceed 100.

In the embodiment of the present invention where a thermally anisotropic sheet comprising or consisting of a fluoropolymer is used, the sheet may be obtained by orienting a fluoropolymeric sheet in one direction parallel to the plane of the sheet (mono-axial orientation) or in two directions perpendicular to each other parallel to the plane of the sheet (bi-axial orientation).

The intrinsic thermal conductivity will be increased in the direction(s) of orientation, so that the sheet will show an increased intrinsic thermal conductivity along one direction within the plane (mono-axial orientation), or along all directions within the plane (bi-axial orientation), as described in EP 2 551 324.

The fluoropolymer of the sheet may be a dense material, i.e. a non-porous material, or may be porous.

The term "porous" as used herein refers to a material which has voids throughout the internal structure which may form an interconnected continuous air path from one surface to the other.

The anisotropic fluoropolymer may also be microporous. This means that the voids are very small and are usually referred to as "microscopic".

A typical pore size of the voids in a microporous fluoropolymer is in the range of 0.01 to 15 micrometer as determined in the mean flow pore size measurement.

A microporous fluoropolymer, for example, is expanded PTFE (ePTFE, EPTFE).

The microstructure of a porous fluoropolymer can include nodes and fibrils, only fibrils, only fibril strands or bundles, or stretched nodes interconnected by fibrils.

In one embodiment of the process of the invention, the thermally anisotropic sheet is composed of more than one layer, and, for example comprises a layer of a thermally isotropic conductive material, such as a metal film.

The sheet used in the process may accordingly be a multilayer composite sheet, for example comprising an upper and lower layer of FEP, sandwiching a layer of a thermally anisotropic material such as a fluoropolymer, and an adjacent layer of a thermally isotropic material such as a metal.

The present invention further relates to an article obtainable by the process of the present invention in any of the above described embodiments.

The present invention further relates to a thermally conductive article comprising a sheet with thickness is from 1 to 500 μm and wherein the article has a thermal conductivity perpendicular to the plane of 1 W/mK or higher wherein preferred embodiments of said article are those as described for the process of the present invention in any of the above described embodiments.

The present invention further relates to a device for the conduction of heat from a heat source to a heat sink comprising an article formed by the process of the present invention in any of the above described embodiments, and to the use of such an article for the production of a device.

The terms "heat source" and "heat sink" are intended to denote any item, which gives off heat and receives heat, respectively.

The device of the invention in addition to the article obtainable by the process of the invention may comprise further components.

In one embodiment, such further components are fluoropolymers. Thus, the device is stable against harsh chemical environments, high temperatures, or UV-light, has a high dielectric strength, electrical insulating properties, flexibility, repellency to water and other liquids, good dielectric properties, shows a good ageing behavior and a stable conductivity over a broad temperature range.

Such a device may be in any form or shape known for such articles in the art; in particular, the article may be a laminate, a thermal interface composite, an electrically insulating heat spreader or a heat pipe.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

FIG. 2b is a schematic depiction of several layers of different materials arranged in the form of a stack according to an embodiment; FIG. 3b is an enlarged schematic depiction of the area A of FIG. 3a; FIG. 5b is an enlarged view of the pleated structure of the cooling ribbon in FIG. 5a.

DETAILED DESCRIPTION

Figure 1A:
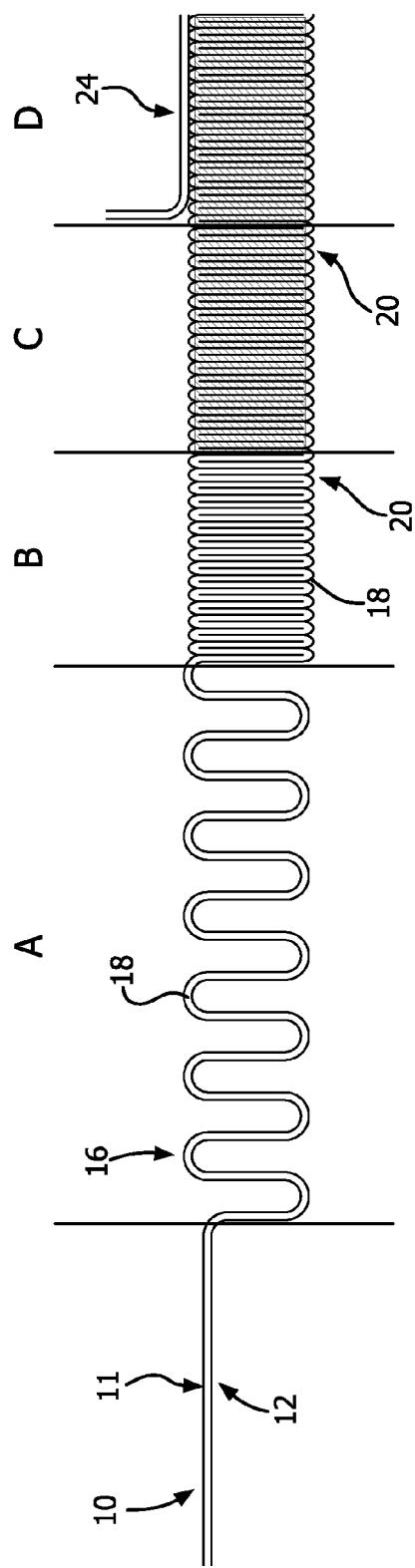
FIG. 1a is a schematic depiction of an embodiment of the process of the invention.

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

A schematic illustration of one embodiment of the process of the present invention is shown in FIG. 1. In FIG. 1a an "endless" sheet 10 is shown in a view perpendicular to the plane of the sheet. The sheet 10 comprises an first surface 11 and a second surface 12 and two opposing edges 13. The untreated sheet 10 is subjected to a first pleating step (section A in FIG. 1) in which bends are created perpendicular to the machine direction of the sheet so that pleats 18 are formed. This step is followed by a second compacting step (section B in FIG. 1), in which the formed pleats 18 are brought into direct contact with each other. This results in a pleated and compacted structure 20. In a following optional bonding step the structure 20 may be fixed, e.g. as shown in FIG. 1 in section C by bonding the surfaces of the pleats 18 to each other. The compacting and bonding of the pleated structure can be carried out in one step.

In order to stabilize the pleated and compacted structure 20 in one embodiment a stabilizing film 24 can be attached to one or more of the surfaces of the structure 20. In section D in FIG. 1 a stabilization film 24 is bonded to the upper surface 19 of the structure 20.

Figure 1B:
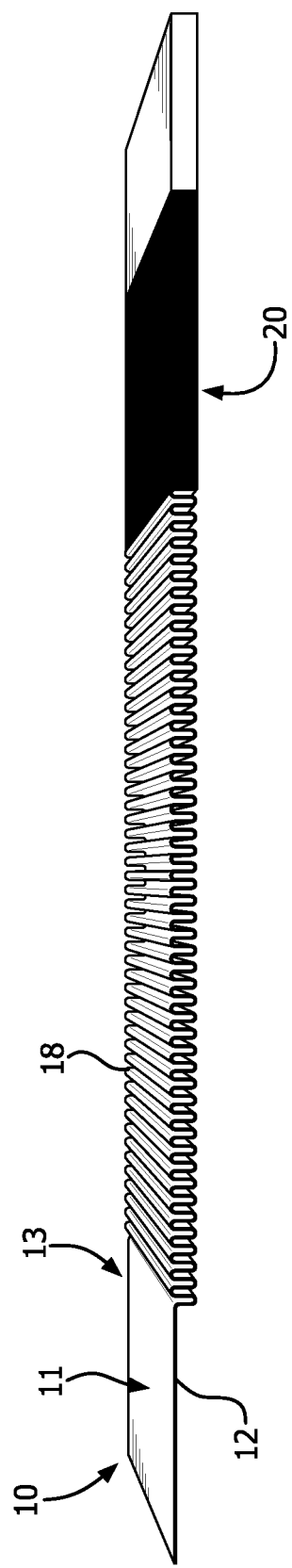
FIG. 1b is a schematic depiction of a perspective view of the embodiment depicted in FIG. 1a, and FIG. 2a is a schematic depiction of several layers of the same material arranged in the form of a stack according to an embodiment.

FIG. 1b is a perspective view of those steps as shown in FIG. 1a.

The sheet 10 can be made of at least one single layer of sheet material. In another embodiment, the sheet 10 comprises several layers of sheet material.

The use of a sheet using several layers is another form to stabilize the pleated and compacted structure 20. Pleats formed by a multilayer sheet are self-standing and show own stability.

FIG. 2 shows embodiments of sheet 10.

In FIG. 2a the sheet 10 comprises several layers 14 of the same material arranged in a stack of one layer on top of the other, e.g. several layers of an thermally anisotropic expanded PTFE.

In FIG. 2b sheet 10 comprises one layer 14 of thermally anisotropic expanded PTFE attached to a metallic film 15, for example made of copper, aluminum or silver. The metallic film 15 can be attached to layer 14 by using a thin adhesive layer of FEP or by vaporizing. The composite can further comprise at least one layer of FEP 16, forming either the upper or lower surface or both surfaces 11, 12.

Figure 3A:
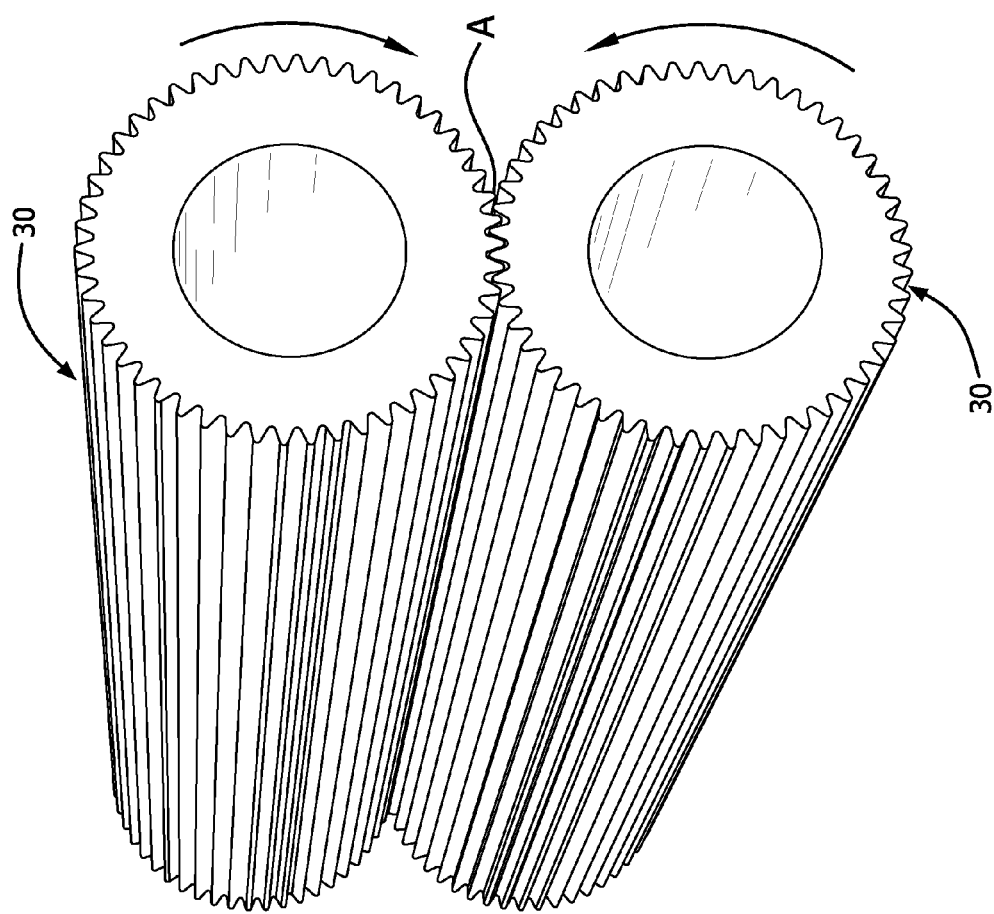
FIG. 3a is a schematic depiction of counter-rotating pleating roils in accordance with an embodiment.
Figure 3B:
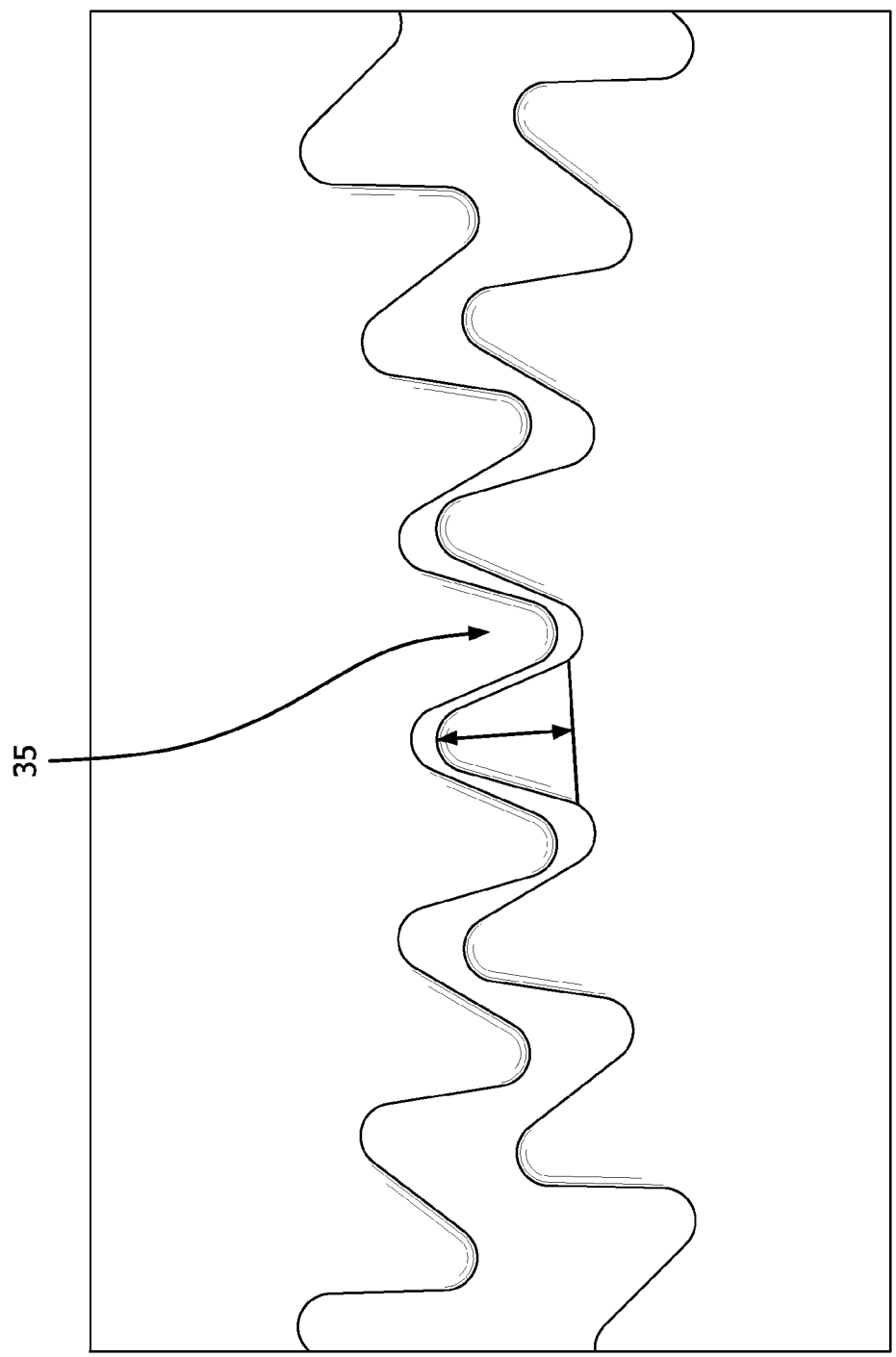

In FIG. 3, a preferred embodiment for the device used for the pleating of the sheet is shown. FIG. 3a shows the device comprising two counter-rotating pleating rolls 30 with teeth 35 through which the unpleated sheet is passed. The distance between the rolls 30 is selected so that the sheet is not disrupted or adversely affected in any way. FIG. 3b shows an enlarged view of the area A of FIG. 3a. This Figure shows an embodiment of the tooth design of the pleating rolls. The tooth high in this example is about 450 micrometer and determines the high of the pleats formed upon passing through the pleating rolls. The end of the tooth is rounded to prevent a disruption of the sheet.

Figure 4:
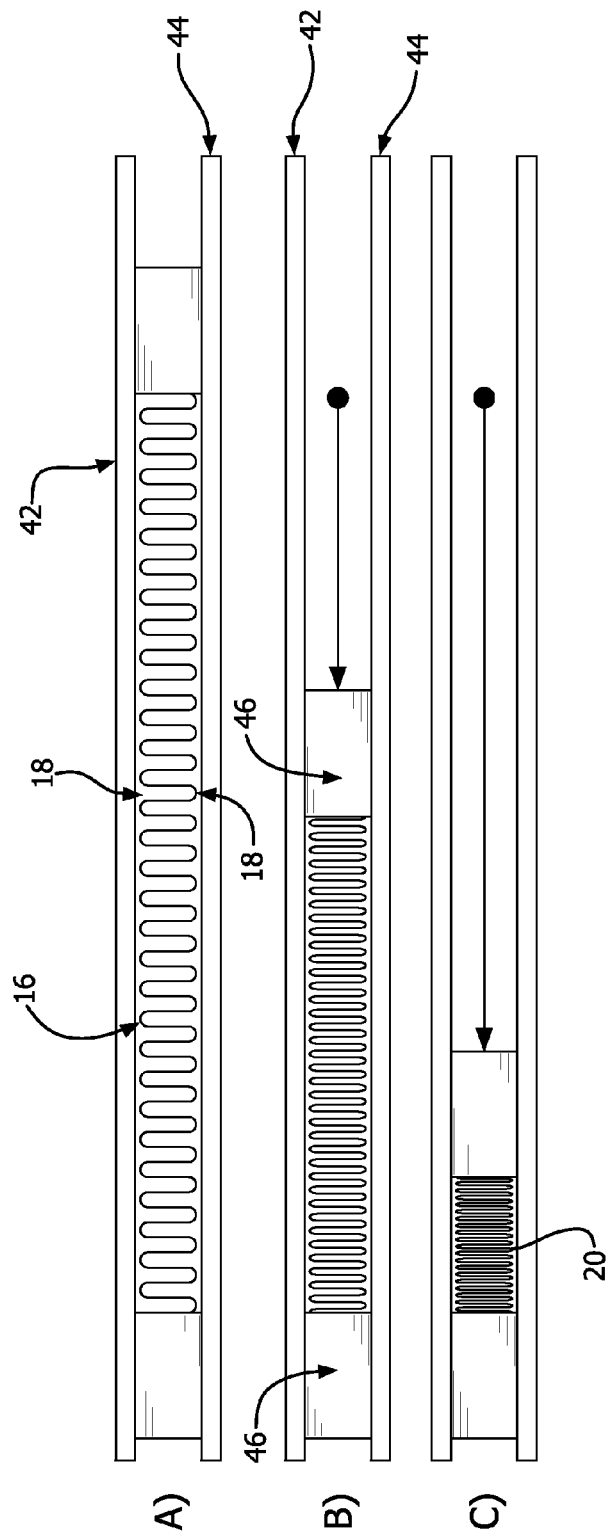
FIG. 4 is a schematic view of one embodiment of the step of compacting the pleated structure in the process of the present invention.
Figure 5A:
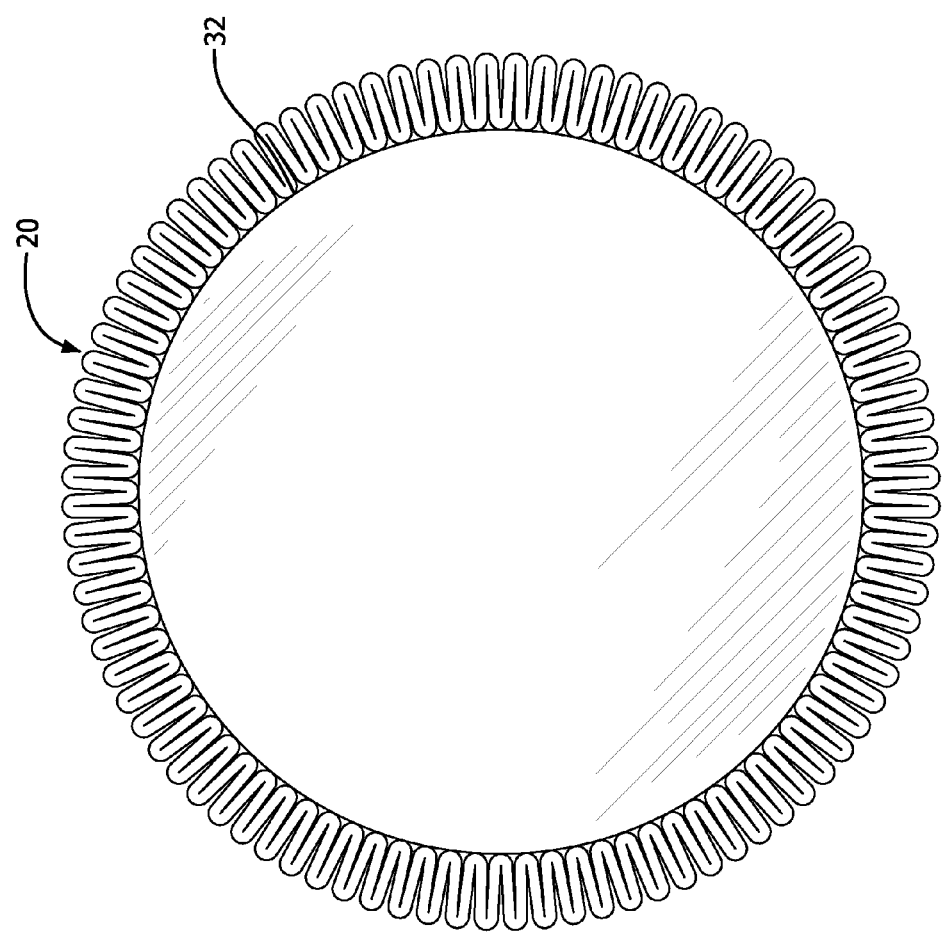
FIG. 5a is a picture of a thermally conductive article in the form of a cooling ribbon obtainable by the process according to the invention.
Figure 5B:
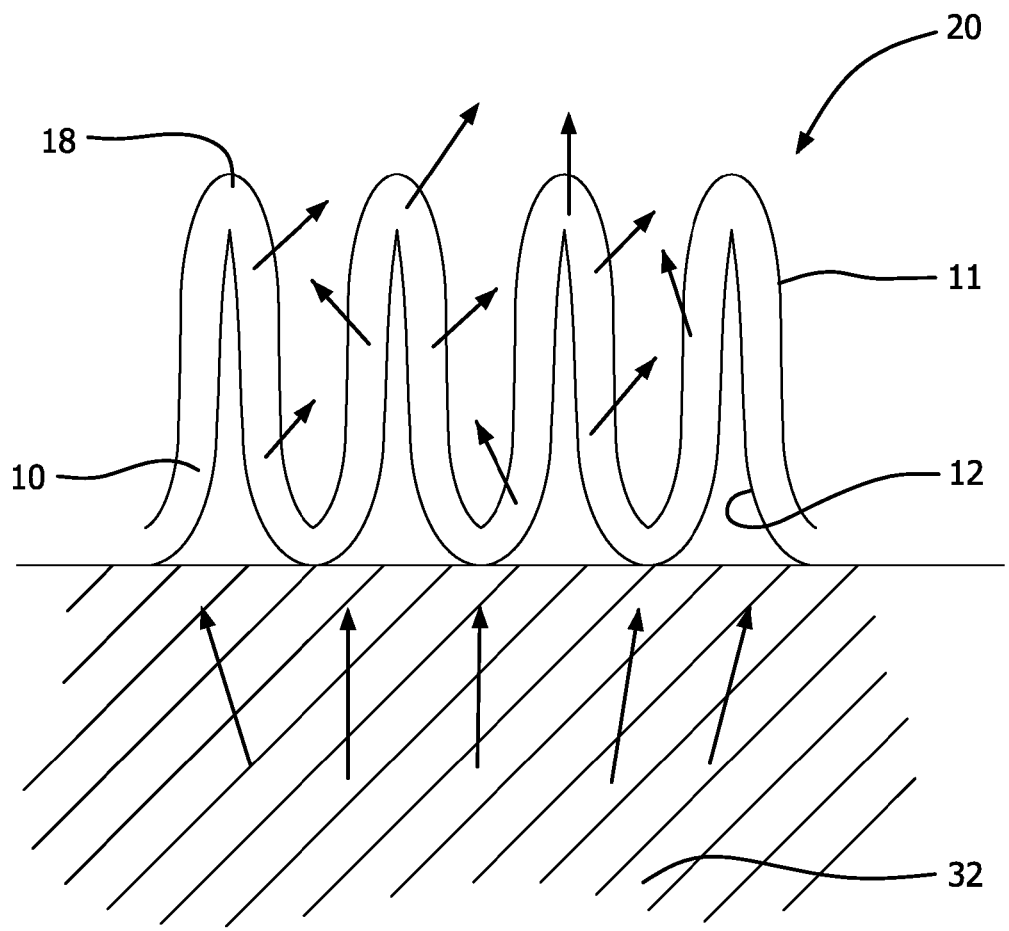

FIG. 4 shows a schematic depiction of a possible embodiment for the compacting of the pleated structure. In FIG. 4a the pleated structure 16 is inserted between two plates, e.g. glass plates. In one example the pleats 18 are arranged substantially vertically between a top plate 42 and a bottom plate 44. The distance between the plates 42, 44 is selected so that it corresponds closely to the height of the (highest) pleats of the pleated structure 16. As depicted in FIGS. 4b and 4c, steel blades 46 with a thickness of approximately the distance between the plates 42, 44 are inserted at the ends of the pleated structure 16 and a pressure is exerted on at least one of the steel blades, so that the pleats 18 are compacted and the surface of the formed pleats is brought in direct contact with each other. In one example, the blades have a thickness of about 400 micrometer FIG. 5a and FIG. 5b show an example of a thermally conductive article obtainable by the process according to this invention.

In that embodiment the pleated and compacted structure 20 comprises a sheet 10 made of multiple layers of a thermally anisotropic material. The pleats 18 are only bonded on its second surface 12, the first and outer surface 11 of the pleats is un-bonded and therefore available for a heat transfer to the outside. Such a structure of "cooling ribbons" creates additional forced convective heat loss and increased surface area.

The pleated and compacted structure 20 is arranged around objects like for example around the outer surface of a metallic thermally conductive stick 32. Heat in the stick can move in the pleats 18 of the structure 20 and be render to the surrounding environment via the first surface 11 of the sheet 10. Such an arrangement forms a cooling ribbon device for heat conducting articles.

Figure 6:
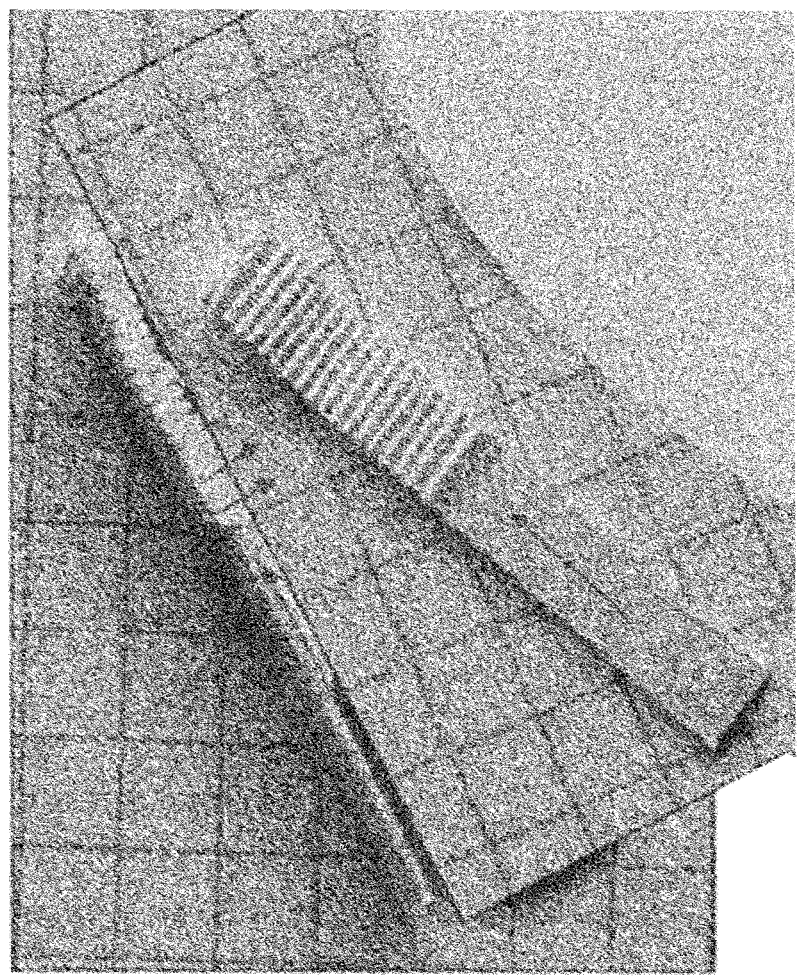
FIG. 6 is a picture of a thermally conductive article in the form of a partially pleated structure obtainable by a process according to the invention.

FIG. 6 shows another example for a thermally conductive article in the form of a partially pleated structure obtainable by a process according to the invention. In this example a sheet made of multiple layers of a thermally anisotropic material has been used. The pleating and compacting step has been carried out only for a part of the sheet. As indicated by the arrows in FIG. 6, the main transport of heat in the non-pleated section is parallel to the main axis and in the folded area the main direction of heat transport is rotated by 90°.

The thermal conductivity was measured according to ISO 22007-2 using a Hot Disk TPS 2500S thermal constants analyser at 40° C.

EXAMPLES

Example 1

A thermally anisotropic expanded PTFE film with a thickness of 10 µm was produced according the following procedure.

Following the procedures disclosed in U.S. Pat. Nos. 3,953,566, 3,962,153, and 4,064,214 a tape was prepared in the following manner: A fine powder PTFE resin was mixed with mineral spirit (22.6 wt % Isopar K™) to form a paste and extruded through a die to form a wet tape of 0.980 mm thickness. Subsequently, the wet tape was rolled down, stretched at a ratio of 1 to 0.75 and then dried at 185° C. to remove the mineral spirit. The dry tape had a final thickness of 0.415 mm. The tape was stretched over hot plates at 350° C. to 370° C., at a total stretch ratio of 78:1. After stretching, tape was not subjected to any further treatment at elevated temperature.

The tape has a thermal conductivity in machine direction of 7.82 W/mK, a thermal conductivity in transverse direction of 1.12 W/mK and a thermal conductivity in the direction perpendicular to the plane of 0.05 W/mK.

The tape is subjected to the process of the present invention starting with the first pleating step in using 2 counter rotating gear wheels with a tooth height of 450 µm and a pleated structure of said tape with a corresponding pleat height of around 450 µm is obtained.

The pleated structure is inserted between two plates, e.g. glass plates, for the second compressing step. The pleats are arranged substantially vertically between a top plate and a bottom plate according to the process as shown in FIG. 4. The distance between the plates is selected so that it corresponds closely to the height of the (highest) pleats of the pleated structure. Steel blades with a thickness of approximately the distance between the plates are inserted at the ends of the pleated structure and a pressure is exerted on at least one of the steel blades by hand for about 3 seconds, so that the pleats are compacted and the surfaces of the formed pleats are brought in direct contact with each other. The blades have a thickness of about 400 micrometer.

The process was carried out once without, and once with the application of a thermal interface wax (Crayotherm® KU-CR of KUNZE Folien GmbH).

Figure 7A:
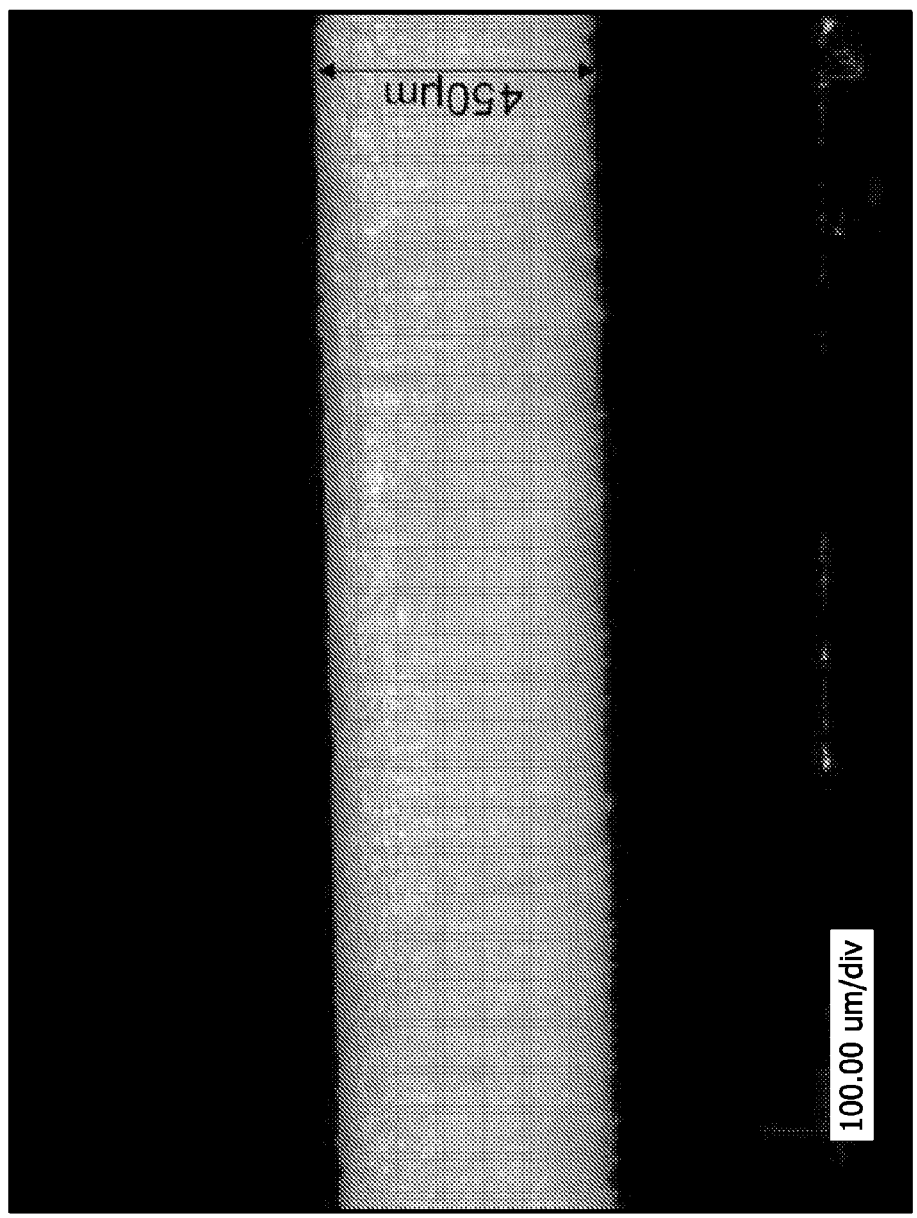
FIGS. 7a and 7b are scanning electron, micrographs (SEMS) of a pleated polytetrafluoroethylene (PTFE) film obtained by Example 1.
Figure 7B:
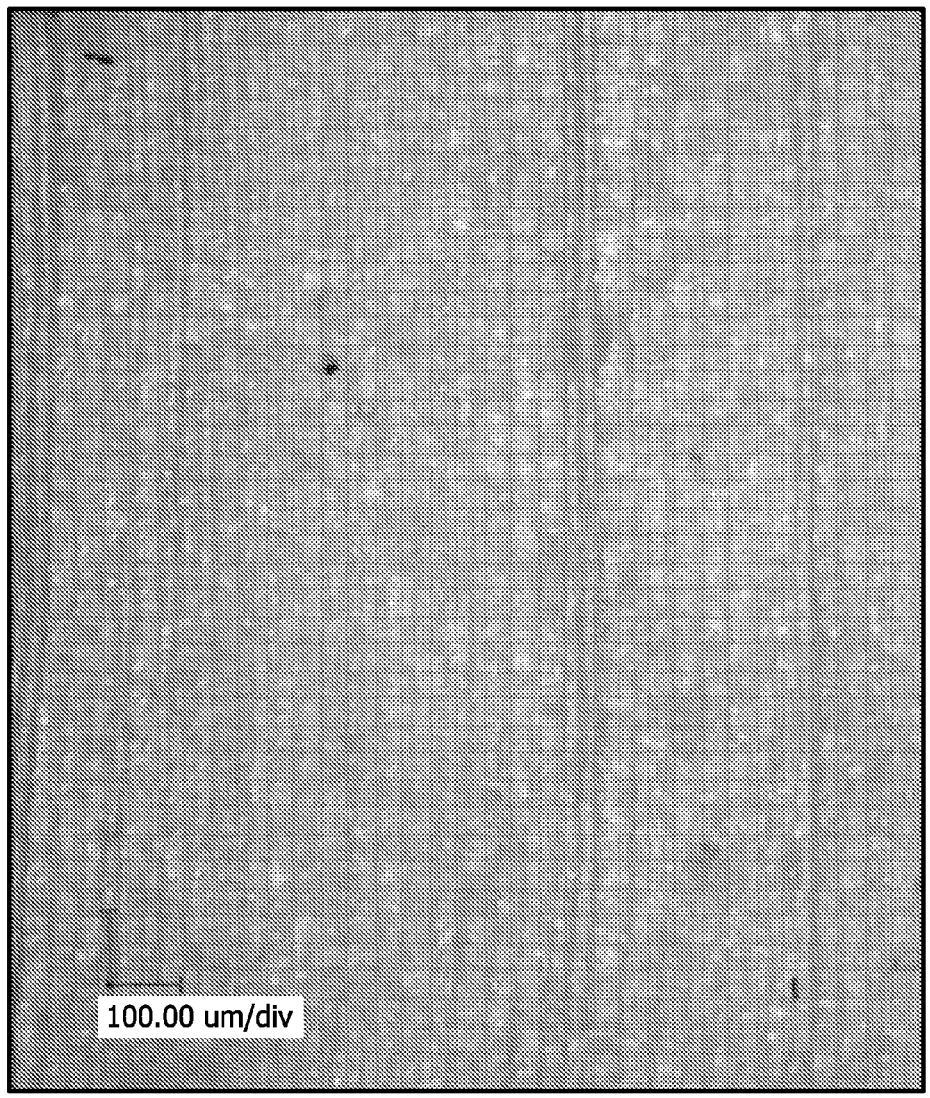

The pleated film is shown in an enlarged view in FIGS. 7a and 7b. The results as regards the thermal conductivity in the direction perpendicular to the pleats, with and without an additional thermal interphase wax is given in Table 1.

Example 2

A thermally anisotropic expanded PTFE film with a thickness of 40 µm was manufactured according to the procedure as described in example 1. In order to manufacture a film with a thickness of 40 µm the dry tape had a final thickness of 0,653 mm. Said film is subjected to the pleating and compressing process of the present invention as described in example 1 and a pleated structure of said film with a pleat height of 450 µm is obtained. The process was carried out once without, and once with the application of a thermal interface wax.

Figure 8A:
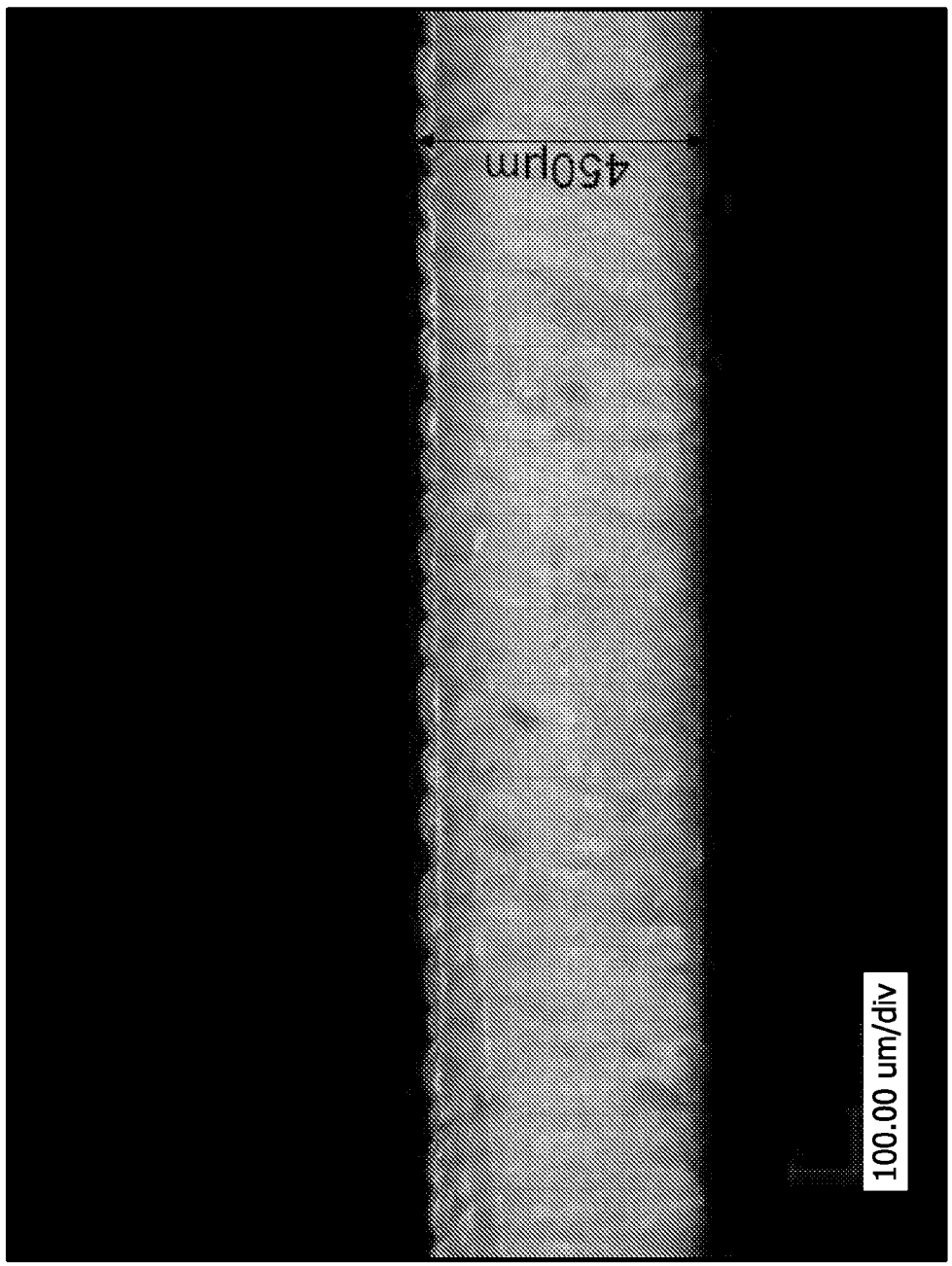
FIGS. 8a and 8b are scanning electron micrographs (SEMS) of a pleated polytetrafluoroethylene (PTFE) film obtained by Example 2.
Figure 8B:
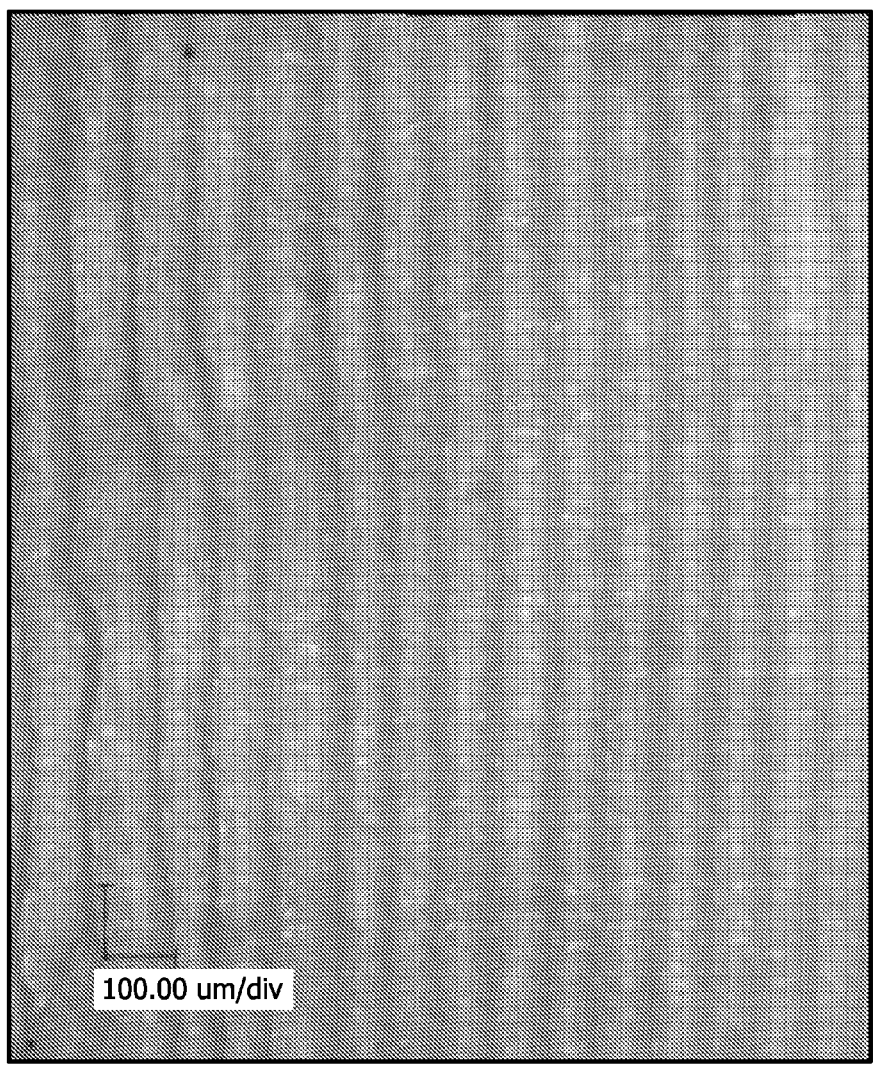

The pleated film is shown in an enlarged view in FIGS. 8a and 8b. The results as regards the thermal conductivity in the direction perpendicular to the pleats, with and without an additional thermal interphase wax is given in Table 1.

Example 3 (Comparative)

Figure 9:
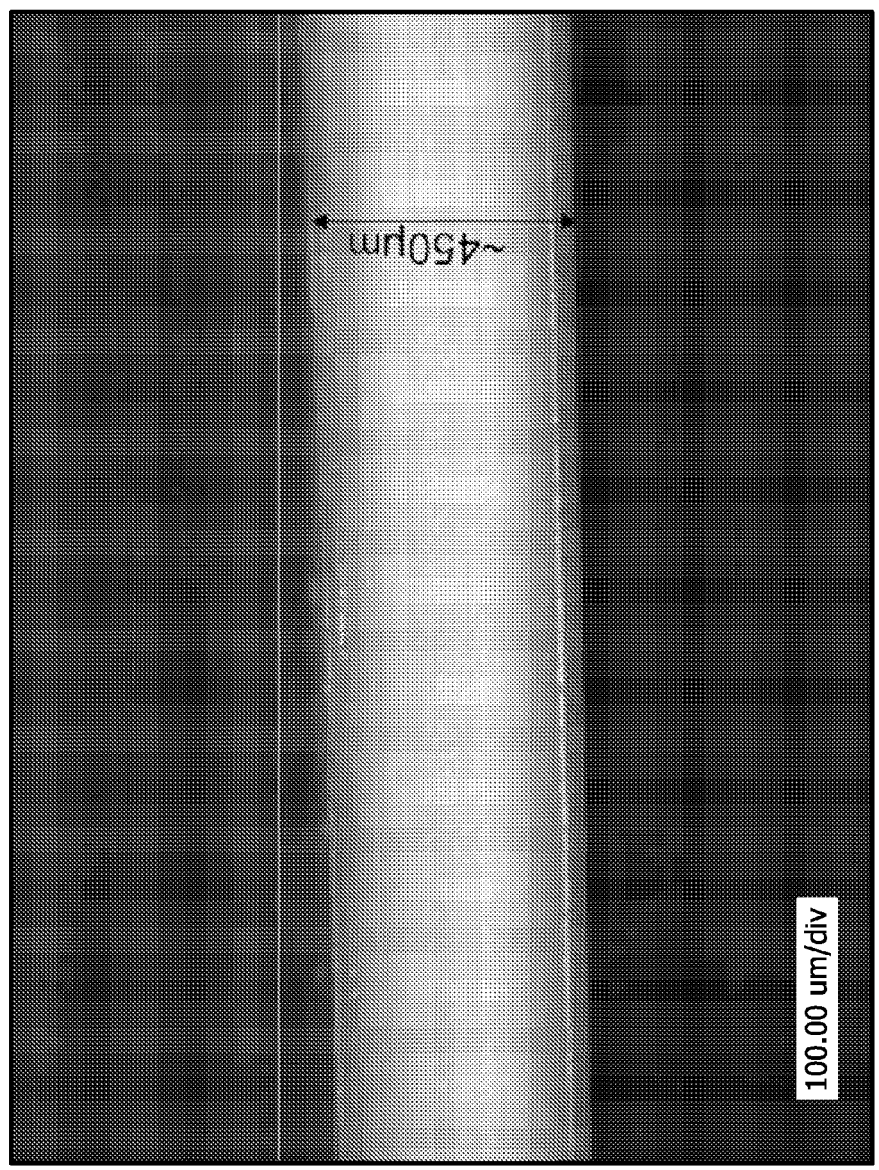
FIGS. 9a and 9b are scanning electron micrographs (SEMS) of a pleated polytetrafluoroethylene (PTFE) film obtained by Example 3.

A thermally anisotropic expanded PTFE film with a thickness of 40 µm was manufactured according to the procedure in example 1. In order to manufacture a film with a thickness of 40 µm the dry tape had a final thickness of 0,653 mm. Eight (8) layers of said film were put one on top of the other forming a stack. The stack was slightly compressed and is shown in FIG. 9. The stack was made once without, and once with application of a thermal interface wax.

The results as regards the thermal conductivity in the direction perpendicular to the film plane are given in Table 1.

Example 4

Figure 10A:
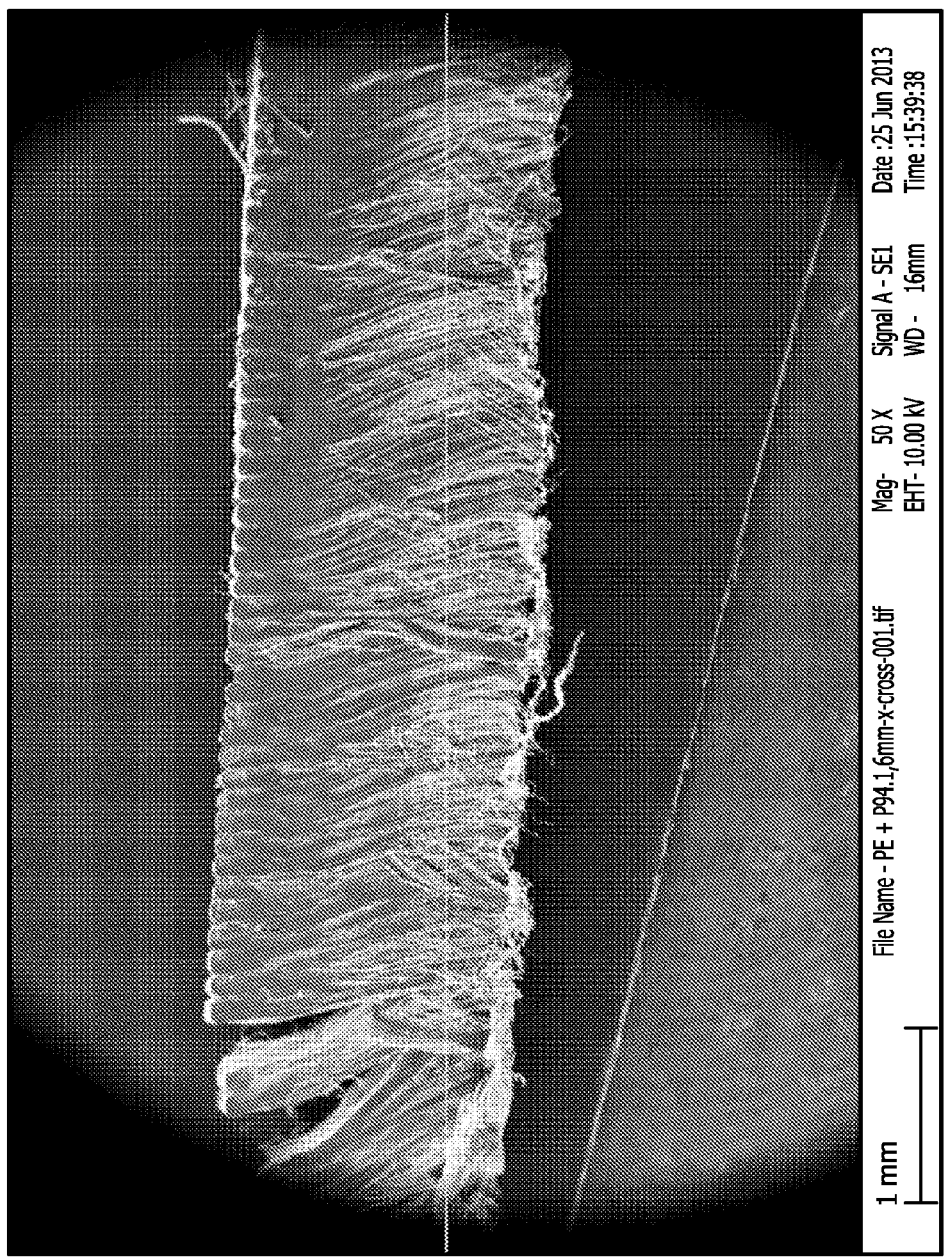
FIGS. 10a and 10b are scanning electron micrograph (SEMS) of a pleated polyethylene film obtained by Example 4.
Figure 10B:
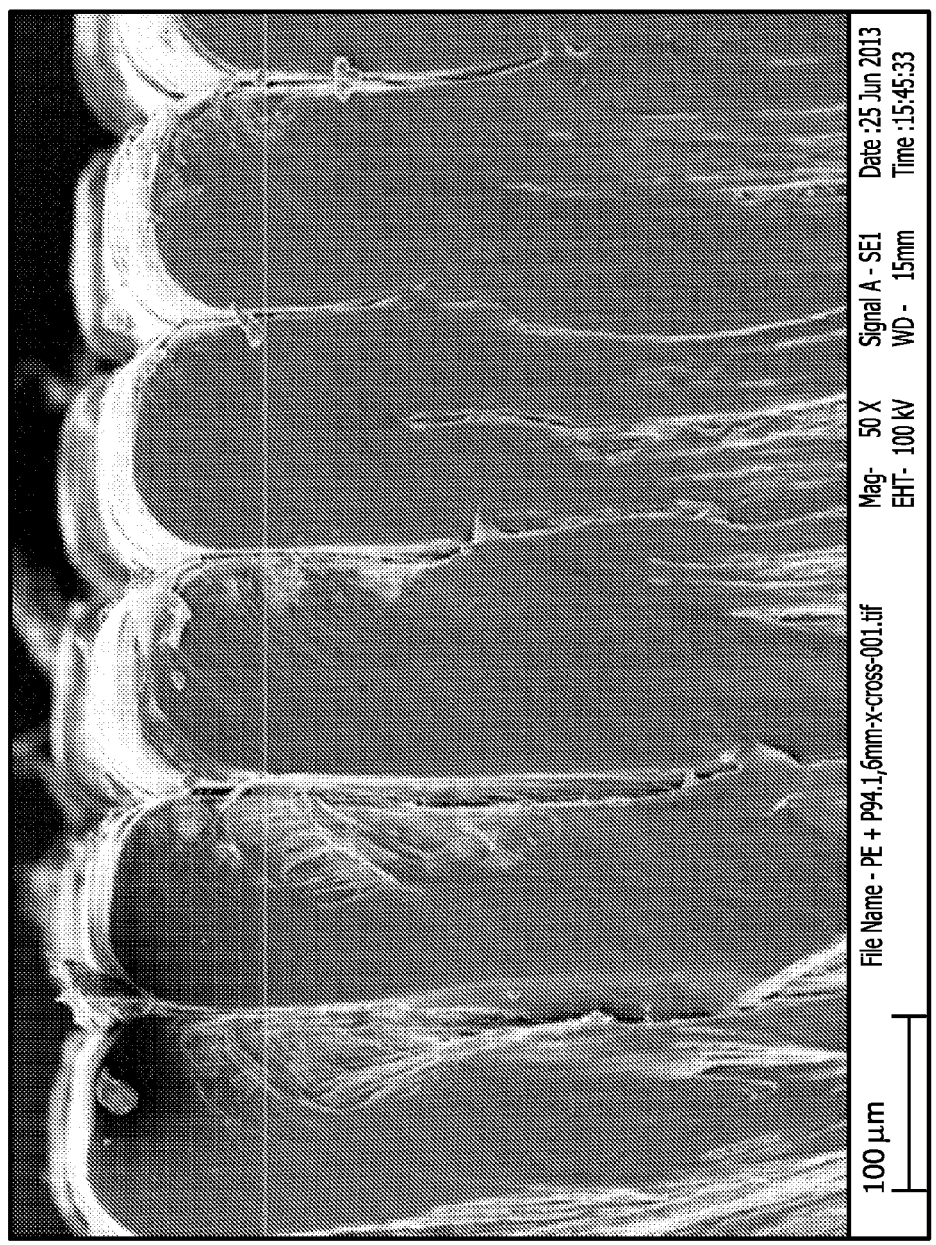

A highly oriented UHMW polyethylene film (commercially available by the company ENDUMAX of Teijin Ltd, Japan) with a thickness of 64 µm has been subjected to the following process:
1) The film was pleated with two counter rotating saving 2 mm tooth height
2) Primer 94 (commercially available by the company 3M Deutschland GmbH, Germany) was applied with a brush on top of the pleat tips and then dried for 3 hours at room temperature to remove the solvent
3) The pleated structure was prior to compacting, arranged in a channel construction made of aluminum. The bottom plate of the channel construction has a width of 80 mm and the side walls of the channel construction have a height of 2 mm. After arranging the pleated structure in the channel construction, a top plate was arranged on top of the construction to close the channel. Two plates, each with a thickness of about 2 mm, were put at the respective ends of the pleated structure and pressed against each other with a pressure by hand. From one side additional pressure was applied with a hammer by hand to compact the material even more. Then the material was put in an oven at 80° C. for 5 min. After the end of the heating step and a 30 min cooling period the top plate was removed and the compacted pleated structure was taken off the channel construction FIG. 10 shows enlarged cross-section views of the pleated and compressed structure.

The results as regards the thermal conductivity in the direction perpendicular to the film plane are given in Table 1,

TABLE 1

| Thermal Properties | |
|---|---|
| | Thermal conductivity in z-direction (perpendicular to pleats/plane of sheet(s)) |
| Example 1 | |
| Unpleated PTFE film | 0.05 W/mK |
| Pleated PTFE film without thermal interface wax | 4 W/mK |
| Pleated PTFE film with thermal interface wax | 5.5 W/mK |
| Example 2 | |
| Unpleated PTFE film | 0.05 W/mK |
| Pleated PTFE film without thermal interface wax | 2 W/mK |
| Pleated PTFE film with thermal interface wax | 7 W/mK |
| Example 3 (comparative) | |
| PTFE film stack without thermal interface wax | 0.06 W/mK |
| PTFE film stack with thermal interface wax | 0.06 W/mK |
| Example 4 | |
| Unpleated PE film | 0.093 W/mK |
| Pleated/compacted/bonded PE film | >10 W/mk |

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:
1. A process for the production of a thermally conductive article, said process comprising:
   pleating at least one thermally anisotropic sheet having a first thermal conductivity in a first plane which is higher than a second thermal conductivity in a second plane that is perpendicular to the first plane to form a pleated structure, said pleated structure comprises a plurality of pleats, each said pleat having a first surface and a second surface; and
   compacting the pleated structure so that said first and second surfaces which face each other due to the formation of said pleats are at least partially brought into direct contact with each other, said pleated structure having an upper surface and a lower surface,
   wherein the thermally anisotropic sheet includes at least one thermally anisotropic polymer layer.
2. The process according to claim 1, further comprising bonding said pleats of at least one of said first and second surfaces to each other.

3. The process according to claim 1, wherein said sheet comprises a plurality of thermally anisotropic expanded polytetrafluoroethylene layers.

4. The process according to claim 1, further comprising bonding a film to at least one of the upper surface and the lower surface of the pleated structure.

5. The process according to claim 1, wherein the sheet is treated with a thermal interphase wax.

6. The process according to claim 1, wherein the pleated structure comprises pleats having a pleat height, and
wherein said pleat height in relation to the sheet thickness is from 1000:1 to 2:1.

7. The process according to claim 1, wherein the pleats having a pleat height, and
wherein said sheet is pleated so that in the pleated structure comprises pleats with different pleat heights.

8. The process according to claim 1, wherein the thermally anisotropic sheet has a thickness from 1 µm to 500 µm.

9. The process according to claim 1, wherein said pleating of the sheet is performed perpendicular to the direction of maximum thermal conductivity.

10. The process according to claim 1, wherein the thermally anisotropic sheet further comprises a layer of a thermally isotropic conductive material.

11. The process according to claim 1, wherein the thermally anisotropic sheet comprises a thermally anisotropic polymer layer.

12. The process according to claim 11, wherein the thermally anisotropic polymer layer comprises a polyolefin or a fluoropolymer.

13. The process according to claim 12, wherein the thermally anisotropic polymer layer comprises a polyethylene.

14. The process according to claim 12, wherein the thermally anisotropic polymer layer comprises a fluoropolymer selected from polytetrafluoroethylene, a modified polytetrafluoroethylene, a fluorothermoplastic, a fluoroelastomer and combinations thereof.

15. The process according to claim 1, wherein the intrinsic thermal conductivity of the thermally anisotropic sheet is 0.5 W/mK or more in the direction of maximum intrinsic thermal conductivity.

16. The process of claim 1, wherein said sheet is a composite sheet comprising a layer of a thermally anisotropic expanded polytetrafluoroethylene attached to a metallic film.

17. The process of claim 16, wherein said composite sheet further comprises an adhesive layer on one or both of an upper side and a lower surface of said composite sheet.

18. A process for the production of a thermally conductive article, said process comprising:
pleating at least one thermally anisotropic sheet having a first thermal conductivity in a first plane which is higher than a second thermal conductivity in a second plane that is perpendicular to the first plane to form a pleated structure;
compacting the pleated structure, said pleated structure having an upper surface and a lower surface, and
bonding a film to at least one of the upper surface and the lower surface of the pleated structure,
wherein the pleated structure comprises a plurality of pleats, said pleats having a first surface and a second surface.

19. A process for the production of a thermally conductive article, said process comprising:
pleating at least one thermally anisotropic sheet having a first thermal conductivity in a first plane which is higher than a second thermal conductivity in a second plane that is perpendicular to the first plane to form a pleated structure; and
compacting the pleated structure, said pleated structure having an upper surface and a lower surface,
wherein the pleated structure comprises a plurality of pleats, said pleats having a first surface and a second surface, and
wherein the sheet is treated with a thermal interphase wax.

20. A process for the production of a thermally conductive article, said process comprising:
pleating at least one thermally anisotropic sheet having a first thermal conductivity in a first plane which is higher than a second thermal conductivity in a second plane that is perpendicular to the first plane to form a pleated structure; and
compacting the pleated structure, said pleated structure having an upper surface and a lower surface,
wherein the pleated structure comprises a plurality of pleats, said pleats having a first surface and a second surface, and
wherein the at least one thermally anisotropic sheet comprises a thermally anisotropic polymer layer.

21. The process according to claim 20, wherein the thermally anisotropic polymer layer comprises a polyolefin or a fluoropolymer.

22. The process according to claim 21, wherein the thermally anisotropic polymer layer comprises a polyethylene.

23. The process according to claim 21, wherein the thermally anisotropic polymer layer comprises a fluoropolymer selected from polytetrafluoroethylene, a modified polytetrafluoroethylene, a fluorothermoplastic, a fluoroelastomer and combinations thereof.

24. The process according to claim 20, further comprising bonding said pleats of at least one of said first and second surfaces to each other.

25. The process according to claim 20, wherein said at least one thermally anisotropic sheet comprises a plurality of thermally anisotropic expanded polytetrafluoroethylene layers.

26. The process according to claim 20, further comprising bonding a film to at least one of the upper surface and the lower surface of the pleated structure.

27. The process according to claim 20, wherein the at least one thermally anisotropic sheet is treated with a thermal interphase wax.

28. The process according to claim 20, wherein the pleated structure comprises pleats having a pleat height, and
wherein said pleat height in relation to a sheet thickness is from 1000:1 to 2:1.

29. The process according to claim 20, wherein the pleats having a pleat height, and
wherein said sheet is pleated so that in the pleated structure comprises pleats with different pleat heights.

30. A process for the production of a thermally conductive article, said process comprising:
pleating at least one thermally anisotropic sheet having a first thermal conductivity in a first plane which is higher than a second thermal conductivity in a second plane that is perpendicular to the first plane to form a pleated structure; and
compacting the pleated structure, said pleated structure having an upper surface and a lower surface,
wherein the pleated structure comprises a plurality of pleats, said pleats having a first surface and a second surface, wherein said at least one thermally anisotropic sheet is a composite sheet comprising a layer of a thermally anisotropic expanded polytetrafluoroethylene attached to a metallic film.

31. The process of claim 30, wherein said composite sheet further comprises an adhesive layer on one or both of an upper side and a lower surface of said composite sheet.

* * * * *